Nov. 1, 1938.  J. A. VOSS  2,135,060
COTTON CUTTING MACHINE
Filed Jan. 26, 1937  5 Sheets-Sheet 3
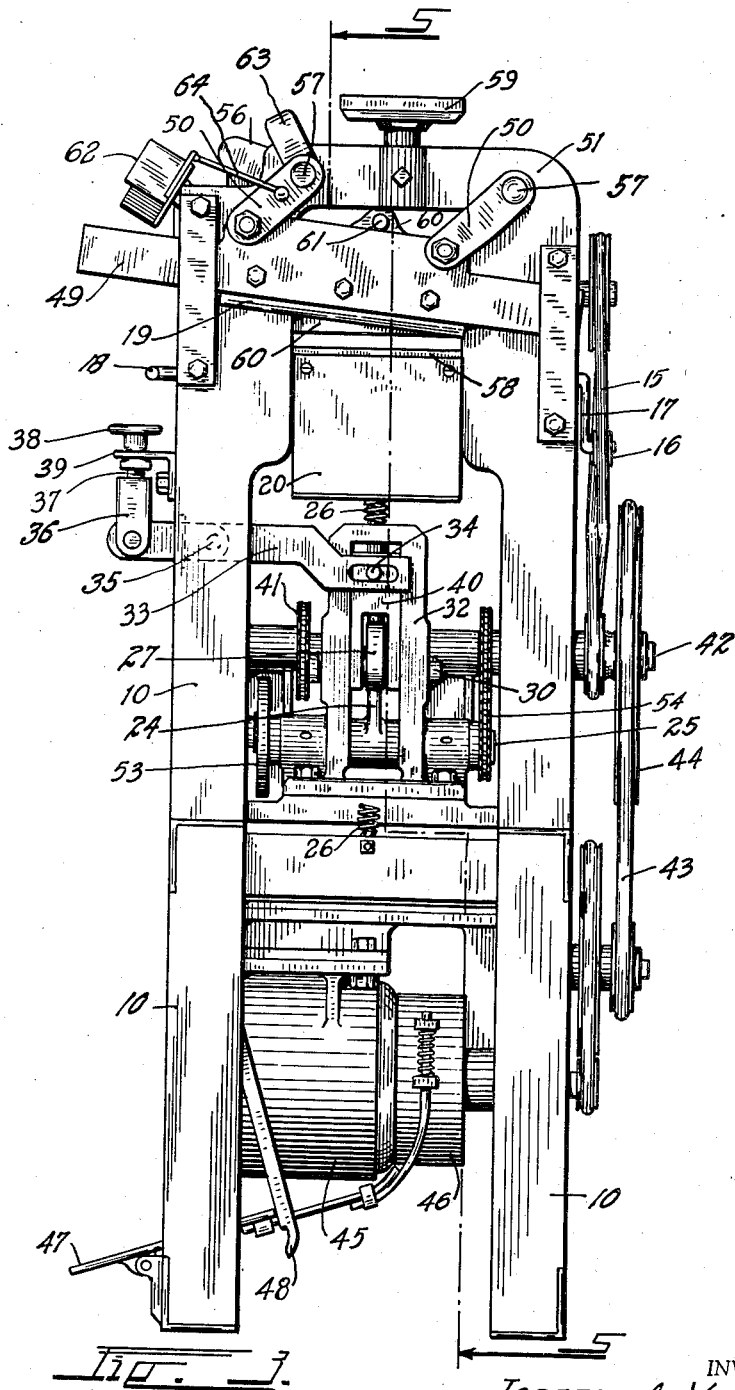
INVENTOR.
JOSEPH A. VOSS.
BY
ATTORNEY.

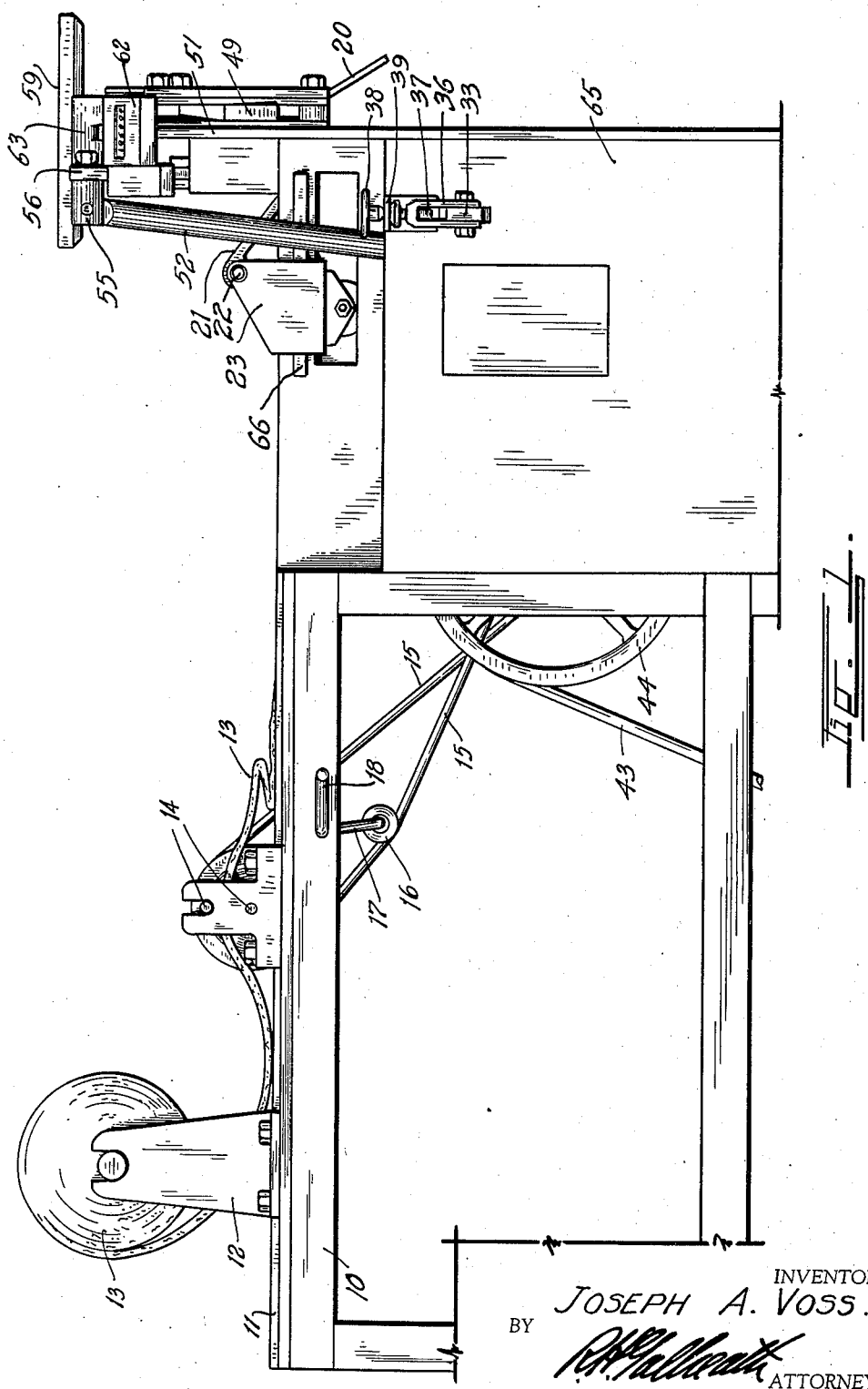

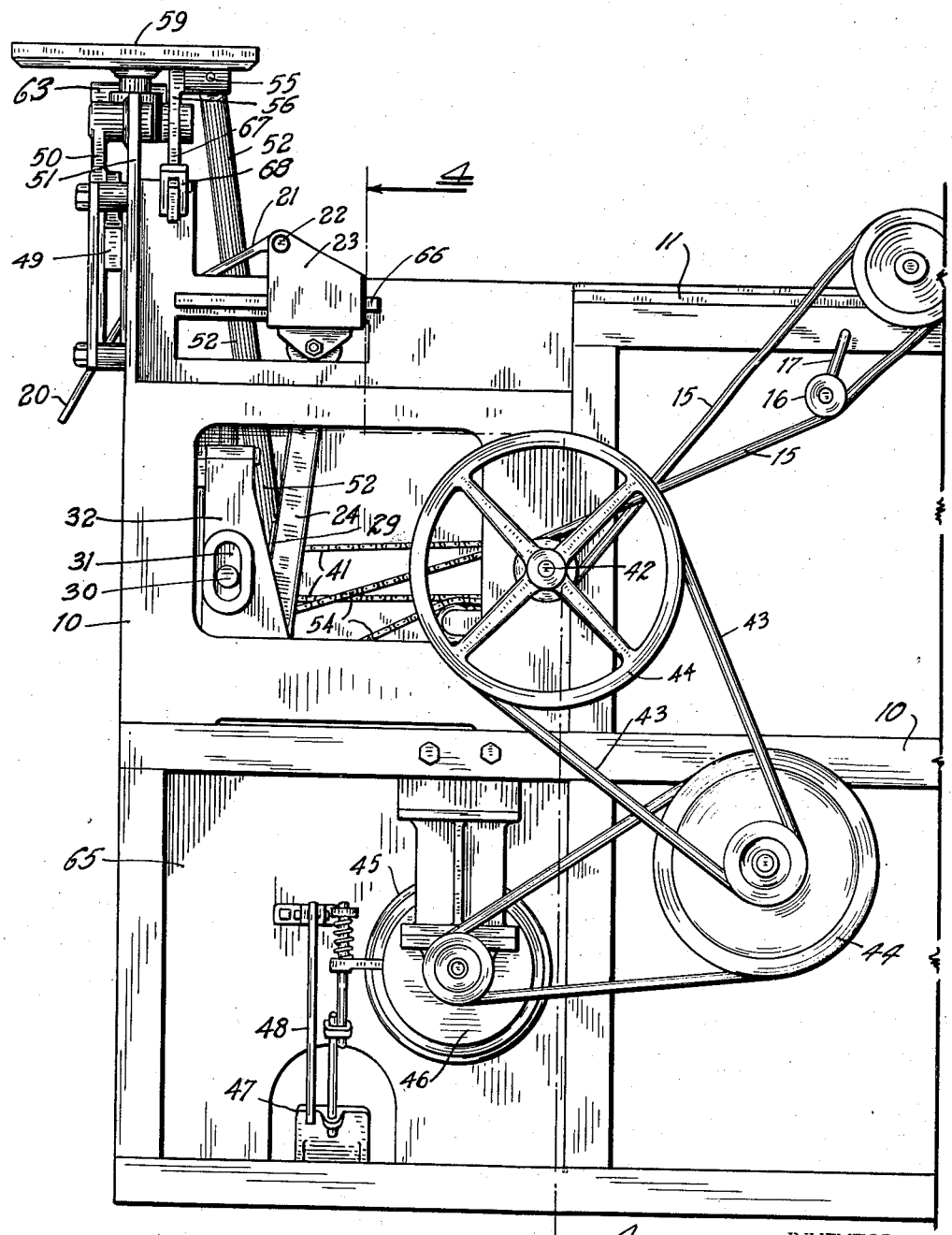

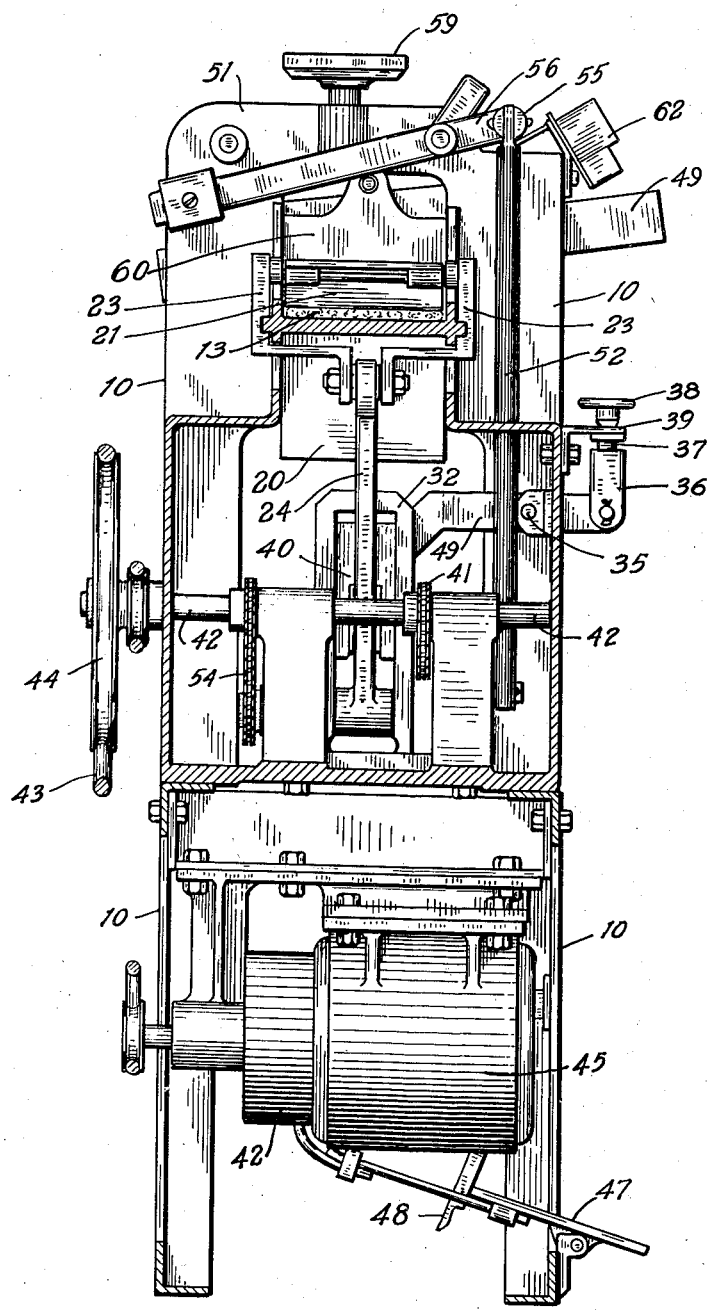

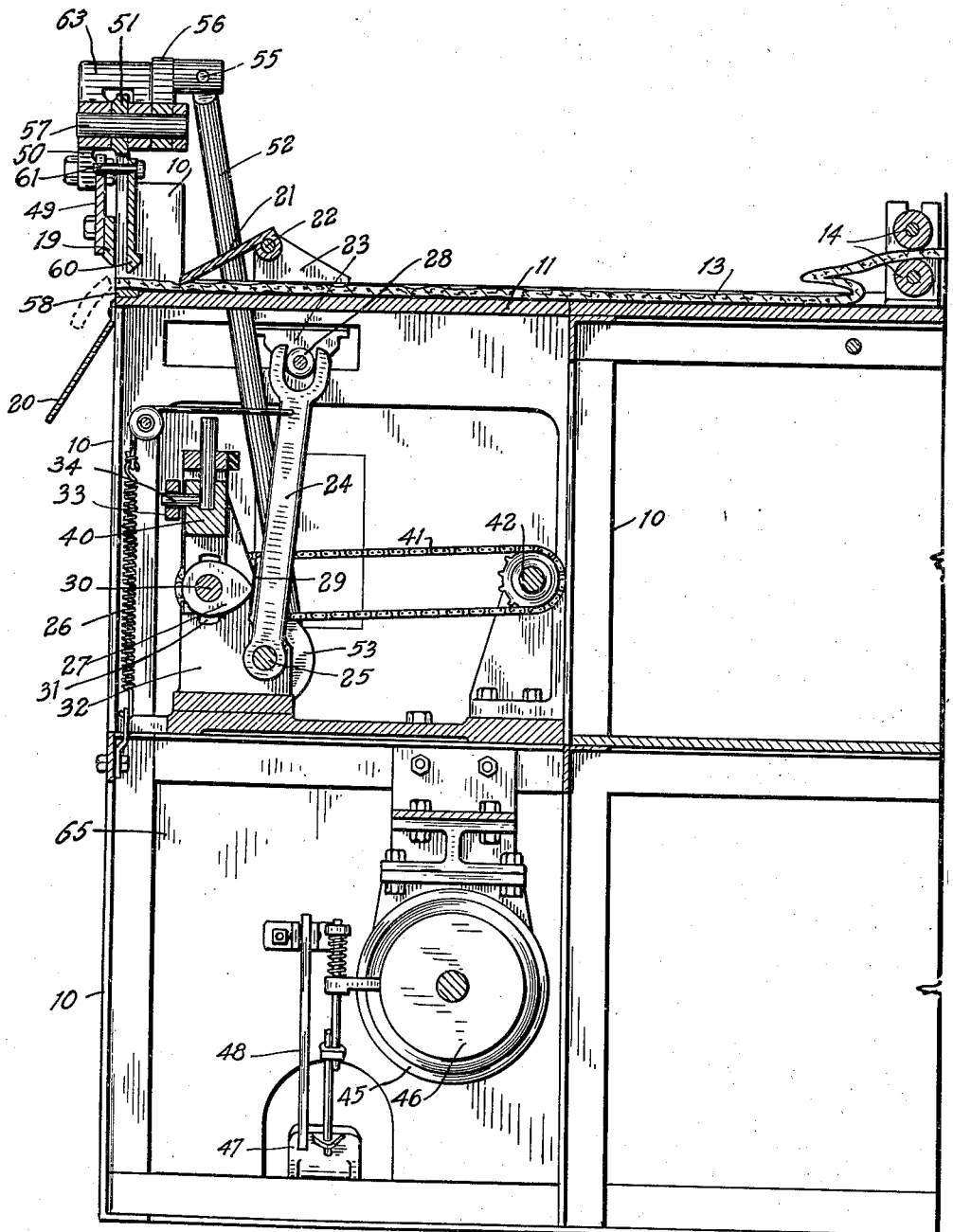

Patented Nov. 1, 1938

2,135,060

UNITED STATES PATENT OFFICE 2,135,060

COTTON CUTTING MACHINE

Joseph A. Voss, Denver, Colo.

Application January 26, 1937, Serial No. 122,373

3 Claims. (Cl. 164—48)

This invention relates to a machine for cutting a continuous strip or sheet of cotton into uniform sized pads and is more particularly designed for cutting cotton pads to be used in the machine for compressing cotton wads for which application for patent is copending, under Serial No. 19,658.

The principal object of the invention is to provide a highly efficient and rapid automatic machine which will cut a continuous strip of cotton or similar material into uniform lengths or pads of uniform weight, without crushing or damaging the cotton.

It is impossible to obtain rolled cotton batting of uniform thickness and uniform width, therefore, in a machine of this type, if pads of uniform weight are desired, some means must be provided for quickly and constantly varying the width of the pad so that the thinner pads will be cut proportionally wider than the thicker pads. Another object of this invention is to provide such means, under the constant control of the operator so that the size of the pad can be regulated to conform to a uniform standard of weight.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a right side elevation of the complete pad cutting machine.

Fig. 2 is a left side elevation of the cutting extremity thereof.

Fig. 3 is an end view looking toward the discharge extremity.

Fig. 4 is a vertical cross section taken on the line 4—4, Fig. 2.

Fig. 5 is a longitudinal section taken on the line 5—5, Fig. 2.

While the machine is particularly designed to cut cotton pads from a continuous strip of cotton it could, of course, be employed to cut parts from any desired material. In this description of the machine, however, the material will be referred to as "cotton".

The invention consists of a supporting frame 10 which supports the entire mechanism. A smooth feed table 11 extends longitudinally of the frame 10 and along the top thereof. A pair of roll brackets 12 extend upwardly from one extremity of the table 11 to support a roll 13 of cotton to be cut by the machine.

The cotton is drawn from the roll 10 by means of a pair of feed rollers 14. The upper feed roller is a weighted idler to press the cotton against the lower feed roller. The lower feed roller 14 is driven through the medium of a suitable belt 15 from a counter-shaft 42. The tension in the belt 15 is regulated by means of a pulley 16 carried on a tension lever 17. The tension lever terminates on the opposite side of the machine in a hand lever 18 by means of which the operator can constantly regulate the tension of the belt 15 so as to allow the feed rollers 14 to move at any desired speed or be brought to a stop if they are feeding the material too rapidly. The strip of cotton is fed through the rollers 14 along the table toward the forward extremity thereof, at which point a knife 19 reciprocates so as to cut the traveling cotton into short sections. The sections slide from the machine on a discharge chute 20.

The cotton strip is fed to the knife at uniform intervals by means of a tucker blade 21 which is hinged to a hinge shaft 22 extending between the extremities of a slidable cross head 23. The tucker blade 21 is held against the cotton by gravity and, as the cross head moves rearwardly, slides over the cotton without imparting movement thereto and then, as the cross head moves forwardly, the blade engages the cotton and pushes it beneath the knife 19. The cross head is reciprocated by a cross head lever 24 hinged at its lower extremity on a cross shaft 25. A tension spring 26 constantly holds the lever 24 against a cam 27, the contour of which forces the lever 24 rearwardly. The spring 26, of course, returns the lever and causes it to follow the cam. A bearing plate 29 on the lever provides a bearing surface on the cam. Should any obstruction, such as the operators hand, be in the path of the cross head 23, it will cease moving instantly upon striking the object since there is nothing to positively force it forward. This provides a safety control for the tucking blade. The upper extremity of the lever 24 rides over a roller bearing 28 in the cross head 23 to provide a frictionless construction.

The width of the pad cut from the strip depends upon the length of the stroke of the cross head 23 and means are provided for accurate regulation of this stroke while the machine is in operation. The length of the stroke of the lever can be varied by varying the distance between the cross head shaft 25 and the contact point of the cam 27. Thus, if the cam contacts a long distance from the shaft 25, the stroke will be less than if it contacts adjacent the shaft 25. Therefore stroke adjustment is provided by providing means for raising and lowering the cam 27 while the machine is in operation. Cam 27 is mounted on a cam shaft 30. The cam shaft 30 passes through a vertically elongated opening 31 in a guide frame 32 which allows it to be moved vertically.

The movement is accomplished by journaling the cam shaft 30 in a yoke 40 which is also carried in the guide frame 32 and which is supported by an adjusting lever 33 which engages a pin 34 in the yoke 40. The lever 33 is pivoted intermediate its extremities on a suitable pivot pin 35 from the frame 10. A clevis 36 is hingedly secured to the outer extremity of the lever 33. An adjusting screw 37 is threaded into the clevis 36. The screw 37 is provided with a hand knob 38. The knob 38 is grooved to receive a fixed bearing bracket 39 which is secured to the frame 10.

Thus, it can be seen that rotation of the knob 38 will thread the screw 37 into or out of the clevis 36 and, since the bracket 39 prevents the screw from moving vertically, it will force the outer extremity of the lever downwardly or upwardly. This in turn causes the inner extremity of the lever 33 to raise or lower the yoke 40, thereby changing the point of contact of the cam 27 with the lever 24 and varying the length of the stroke of the cross head.

The cam shaft 30 is driven through the medium of a flexible chain 41 from the counter-shaft 42. The counter-shaft 42 is driven through the medium of suitable speed reduction belts 43 and pulleys 44 from a driving motor 45. The motor 45 is preferably of a type having a friction clutch built therein. On the drawing the clutch mechanism is represented by a clutch housing 46. The clutch is operated from a clutch pedal 47. A locking latch 48 is provided to hold it in engagement. The operator can quickly kick the latch 48 out of engagement with the pedal 47 to disengage the clutch and bring the machine to an instant stop.

The knife blade 19 is supported from a knife block 49 which hangs from a pair of links 50. The links 50 are journalled at their upper extremities on hinge pins 57 supported in an arch member 51, extending upwardly from the frame 10. The arch member 51 also supports a weighing scale table 59. It is prefered to position one of the links 50 higher than the other so that the knife will descend on a diagonal stroke to impart a shearing action to the knife 19.

The knife is operated through the medium of a connecting rod 52 from crank disc 53 on the cross shaft 25. The cross shaft 25 is driven from the counter-shaft 32 through the medium of a chain 54. The connecting rod 52 terminates in a universal joint 55 on an operating crank 56 which is keyed on the hinge pin 57 of one of the links 50 therefore, each time the connecting rod 52 reciprocates, it will swing the links 50. These links will, in turn, swing the knife blade 19 downwardly on a curved diagonal stroke which causes it to easily shear the cotton. This shearing action is accomplished in cooperation with a stationary blade 58 on the extremity of the table 11.

The shaft 25 rotates at the same speed as the cam shaft 30 so that the knife will make a stroke each time the tucker blade completes its stroke.

It is, of course, necessary to have some means of holding the cotton down during the reciprocation of the knife blade 19, this is accomplished by means of a weighted hold-down bar 60 which is slidably mounted in the arch member 51 so that it may move up and down over the cotton. The hold-down bar is lifted on the forward stroke of the tucking blade by means of a contact pin 61 which reaches forwardly from the bar 60 above the knife block 49. Thus, as the knife back swings upwardly it will strike the pin 51 and lift the bar 60 to allow the tucker blade to push the cotton forwardly. As the knife descends, the bar 60 will preceed it and, by its own weight, clamp the cotton against the lower blade 58 before the knife 19 reaches it. On the up stroke, the knife 19 will completely disengage the cotton before the hold-down bar leaves it.

In operation the operator places a roll of cotton in the supporting brackets 12 and feeds this cotton under the upper roller 14, the bearings of this roller being slotted so that it may be lifted. The cotton is then fed beneath the tucker blade 21 to the extremity of the table. The operator then takes his position at the left side of the machine opposite the adjusting screw 37 and the pedal 47 and with the latter engages the motor clutch. The cross head reciprocates rapidly back and forth, and at each reciprocation tucks a length of cotton beneath the knife blade 19. At the completion of each stroke of the tucker blade, the knife 19 swings and shears a pad from the strip.

At intervals, the operator takes one of the sheared pads from the chute 20 and places it on his weighing scale on the scale table 29. If it is running too heavy he shortens the tucking stroke to narrow the cut pad. In case the pads are too light, the reverse action is accomplished to increase the width of the strip. In this way the operator constantly controls the width and weight of the cut pads.

It is preferred to relieve the torque strain on the upper hinge pin 57, which transmits the movement to the knife, by extending an inverted V-shaped connecting member 63 from the crank 56 over the arch member 51 to the upper link 50.

The number of pads cut by the knife in a given length of time can be determined by means of a counting meter 62 which may be connected to any reciprocating part of the machine. As illustrated the meter 62 is connected to one of the knife links 50 by means of a suitable connecting rod 64.

If desired the crank 56 may be extended to provide a counterweight lever 67 for receiving a suitable counterweight 68 for counterbalancing the weight of the knife 19, knife block 49, and hold-down bar 60.

Cross head guides 66 are provided on the frame 10 for guiding the horizontal movement of the cross head 23. The operating mechanism may be enclosed by suitable side plates 65 if desired.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A machine for cutting strip material into relatively short lengths comprising: a work table for supporting said material; a stationary knife blade at one extremity of said table; a reciprocating knife blade hingedly supported above said stationary knife blade; a reciprocating member moving at right angles to said blades; an inclined tucking blade hingedly supported by said reciprocating member so as to rest upon the material on said table; means for reciprocating said knife; a lever hinged at its lower extremity and contacting said reciprocating member at its upper extremity; a cam shaft extending across said lever; a vertically movable frame carrying said cam shaft; a cam on said cam shaft; a spring urging said lever against said cam; and means for raising and lowering said frame to vary the point of contact between said cam and said lever along the length of the latter.

2. A machine for cutting strip material into relatively short lengths comprising: a work table for supporting said material; a stationary knife blade at one extremity of said table; a reciprocating knife blade hingedly supported above said stationary knife blade; a reciprocating member moving at right angles to said blades; an inclined tucking blade hingedly supported by said reciprocating member so as to rest upon the material on said table; means for reciprocating said knife; a lever hinged at its lower extremity and contacting said reciprocating member at its upper extremity; a cam shaft extending across said lever; a vertically movable frame carrying said cam shaft; a cam on said cam shaft; a spring urging said lever against said cam; a supporting lever hinged intermediate its extremities and supporting said frame at its one extremity; and screw means for raising or lowering the other extremity of said lever so as to vary the point of contact between said cam and said first lever along the length of the latter to vary the stroke of said tucking blade.

3. In a machine for cutting strip material into uniform lengths of the type having a reciprocating knife and a work table for supporting said material, means for feeding material from said table to said knife at intervals, comprising: a cross-head slidably mounted on each side edge of said table; a hinge bar extending between cross-heads over said table; a tucking blade hinged on said bar at one side and resting by gravity on said table at the other side; a lever below said table pivoted at its lower extremity and extending upwardly to contact said cross-heads; a cam shaft positioned between said lever and said knife; a cam on said shaft contacting said lever; a spring drawing said lever into contact with said cam so that said spring will move said tucking blade toward said knife and said cam will move said blade away from said knife; a vertically movable bearing member supporting said cam shaft and means for raisng or lowering said bearing member to vary the point of contact of said cam along said lever; a supporting lever supporting said bearing member at its one extremity and a jack screw for absorbing the up thrust of the other extremity of said supporting lever so actuation of said screw will cause said lever to raise said bearing member to vary the point of contact of said cam along said lever.

JOSEPH A. VOSS.